US009420666B2

(12) United States Patent
Carreras Molins

(10) Patent No.: US 9,420,666 B2
(45) Date of Patent: Aug. 16, 2016

(54) OPTOELECTRONIC DEVICE, SYSTEM AND METHOD FOR OBTAINING AN AMBIENT LIGHT SPECTRUM AND MODIFYING AN EMITTED LIGHT

(75) Inventor: Josep Maria Carreras Molins, Barcelona (ES)

(73) Assignee: FUNDACIO INSTITUT DE RECERCA DE L'ENERGIA DE CATALUNYA, Sant Adria Del Besos (ES)

( * ) Notice: Subject to any disclaimer, the term of this patent is extended or adjusted under 35 U.S.C. 154(b) by 278 days.

(21) Appl. No.: 13/978,134

(22) PCT Filed: Jan. 3, 2011

(86) PCT No.: PCT/EP2011/050002
§ 371 (c)(1),
(2), (4) Date: Jul. 2, 2013

(87) PCT Pub. No.: WO2012/092956
PCT Pub. Date: Jul. 12, 2012

(65) Prior Publication Data
US 2013/0293116 A1 Nov. 7, 2013

(51) Int. Cl.
*H05B 37/02* (2006.01)
*H05B 33/08* (2006.01)

(52) U.S. Cl.
CPC ............ *H05B 37/02* (2013.01); *H05B 33/0872* (2013.01); *H05B 37/0218* (2013.01); *Y02B 20/46* (2013.01)

(58) Field of Classification Search
CPC . H05B 37/02; H05B 37/0218; H05B 33/0872
USPC ................................. 315/149, 152, 291, 294
See application file for complete search history.

(56) References Cited

U.S. PATENT DOCUMENTS 5,965,873 A * 10/1999 Simpson et al. ............ 250/214.1
6,448,550 B1 * 9/2002 Nishimura .................... 250/226
(Continued)

FOREIGN PATENT DOCUMENTS

CN 1725923 A 1/2006
CN 101535786 A 9/2009
(Continued)

OTHER PUBLICATIONS

International Search Report and Written Opinion of the International Searching Authority. International Application No. PCT/EP2011/050002, issued by the European Patent Office, mail date Feb. 17, 2012, Rijswijk, Netherlands.

*Primary Examiner* — Kenneth B Wells
(74) *Attorney, Agent, or Firm* — Peter B. Scull; Hamilton, DeSanctis & Cha, LLP

(57) ABSTRACT

An optoelectronic device is provided having a plurality of light emitters arranged to be able to illuminate an area of an environment, a CMOS based miniaturized spectrometer arranged to obtain the light spectrum of environmental light within the area of the environment, and control devices, means or methods for modifying the emission of the light emitters, based on the obtained light spectrum. Also, a system for modifying the environmental light of an area is provided, the system having at least two optoelectronic devices, and devices, means or methods to transmit information between them. Furthermore, a method for modifying the environmental light of an area, a computer program product for performing said method, a reflective device for determining the calibration of an optoelectronic device, and a method thereof.

20 Claims, 4 Drawing Sheets

(56) References Cited

U.S. PATENT DOCUMENTS

| | | | | |
|---|---|---|---|---|
| 7,057,735 | B2* | 6/2006 | Jasapara | 356/485 |
| 7,084,973 | B1* | 8/2006 | Ingram | 356/326 |
| 7,345,764 | B2* | 3/2008 | Bulovic | G01J 3/02 356/408 |
| 7,595,786 | B2* | 9/2009 | Shih | 345/102 |
| 7,619,193 | B2* | 11/2009 | Deurenberg | 250/205 |
| 7,642,730 | B2* | 1/2010 | Dowling et al. | 315/292 |
| 7,728,984 | B2* | 6/2010 | Waegli et al. | 356/480 |
| 7,835,599 | B2* | 11/2010 | Beaulieu et al. | 385/12 |
| 8,018,450 | B2* | 9/2011 | Kimura et al. | 345/207 |
| 8,045,158 | B2* | 10/2011 | Shibayama | 356/328 |
| 8,174,695 | B2* | 5/2012 | Choi et al. | 356/328 |
| 8,492,983 | B1* | 7/2013 | Berg et al. | 315/185 R |
| 8,653,758 | B2* | 2/2014 | Radermacher et al. | 315/309 |
| 8,708,560 | B2* | 4/2014 | Kraemer | 374/162 |
| 8,734,536 | B2* | 5/2014 | Beck et al. | 29/25.01 |
| 8,931,939 | B2* | 1/2015 | Melzner et al. | 362/512 |
| 2005/0057751 | A1* | 3/2005 | Schenk | G01J 3/06 356/328 |
| 2006/0018118 | A1 | 1/2006 | Lee et al. | |
| 2008/0291445 | A1 | 11/2008 | Iwane | |
| 2010/0007491 | A1 | 1/2010 | Kleihorst et al. | |
| 2010/0252737 | A1 | 10/2010 | Fournel et al. | |
| 2010/0289039 | A1 | 11/2010 | Van Gorkom et al. | |
| 2010/0308737 | A1 | 12/2010 | Hilgers | |

FOREIGN PATENT DOCUMENTS

| | | |
|---|---|---|
| CN | 101868864 A | 10/2010 |
| DE | 102007042573 A1 | 3/2009 |
| JP | 2006032350 A | 6/2006 |
| JP | 2008256594 A | 10/2008 |
| JP | 2009544965 A | 12/2009 |
| JP | 2010539682 A | 12/2010 |
| WO | WO2008012715 A2 | 1/2008 |
| WO | WO2009034515 A2 | 3/2009 |
| WO | WO2009047605 A1 | 4/2009 |
| WO | WO2009115961 A | 9/2009 |

* cited by examiner

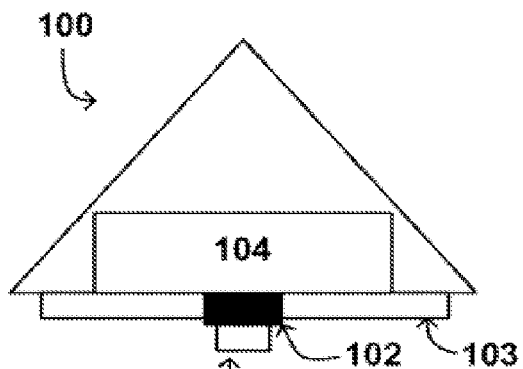
FIG.1
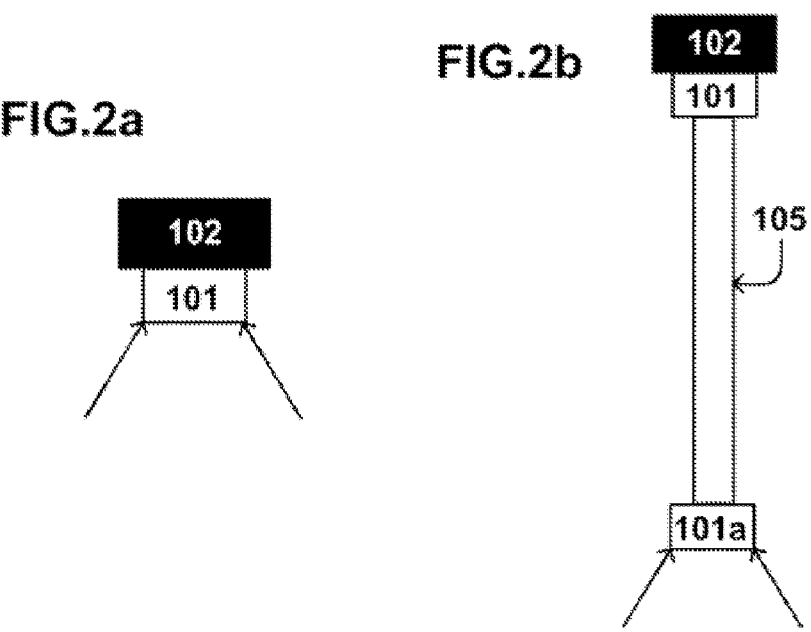
FIG.2a
FIG.2b
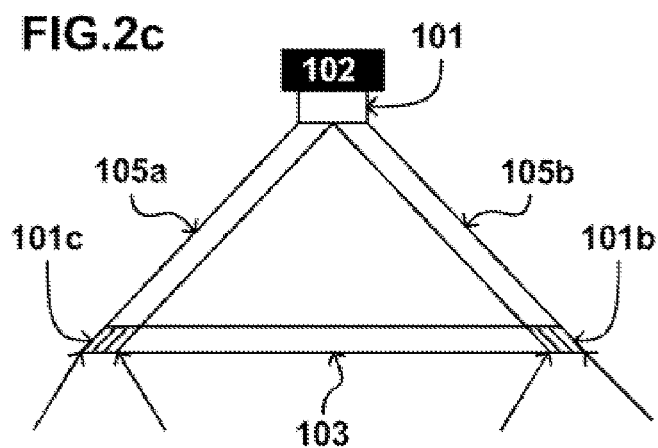
FIG.2c

OPTOELECTRONIC DEVICE, SYSTEM AND METHOD FOR OBTAINING AN AMBIENT LIGHT SPECTRUM AND MODIFYING AN EMITTED LIGHT

This application is the U.S. national phase application of and corresponding to international application PCT/EP2011/050002 filed Jan. 3, 2011.

FIELD

The present disclosure relates to an optoelectronic device for obtaining an ambient light spectrum and controlling an emitted light, and a system for modifying an emitted light.

The disclosure also relates to one or more of a method for modifying an emitted light, a computer program product comprising instructions to perform said method, a reflective device for determining the calibration of an optoelectronic device, and a method for determining the calibration of an optoelectronic device.

BACKGROUND

Nowadays, within the field of lighting systems, a wide range of different lighting devices able to arbitrarily reproduce light spectra exist, the spectra previously obtained by means of a separate light spectrum analyzer device (such as scientific-grade equipment) or other devices specifically designed by experts with enough knowledge about physics and engineering of light spectra.

There also exist lighting apparatus that include light sensors and light sources, the light sensors being focused to obtain properties (e.g. color coordinates or light levels) of the light emitted by the light sources for adjusting or calibrating said emitted light in order to finally match it to a given reference value.

Other types of lighting devices integrating light sensors and light sources are also known, said light sensors being used for detecting presence (of people, for example) and adapting the intensity of the light emitted by the light sources according to the result of said detection. For example, in some devices the intensity of the light is decreased in case of not detecting presence with the objective of saving electric energy.

For example, the US patent application US 2010/0007491 A1 describes an integrated image recognition and spectral detection device particularly suitable for monitoring settings of a light. The application also describes how to automatically control the settings of a light through image recognition and spectral detection of the light exiting the same lighting device, particularly how to automatically control changes in the color properties of the light in response to the image recognition. To do so, the device includes an image sensor array for recognizing images and motion, and a light filtering structure, that may be for example a Fabry-Perot resonator structure or an array of cut filtered glass, for detecting spectral components of received light.

However, the above mentioned lighting devices present some drawbacks related to the fact that they modify the emission of their light output by using either a pre-stored spectral parameter or a measure of a light property which is inaccurate for certain applications, due to the fact that they use filters or other structures, that are not accurate enough for obtaining detailed spectral properties of light. In other words, said lighting devices are not suitable for use in interactive lighting environments where spectral changes occur as a consequence of multiple reflections caused by, for example, moving objects found in the environment where the device is placed or changes in daylight conditions of the environment, and also, they are not able to react to said spectrum changes accordingly in real time.

SUMMARY

Therefore, with an aim of surmounting the limitations of the devices found in the state of the art so that they are able to find new applications, a device and method for measuring ambient spectra and modifying a light spectrum of an emitted light is provided which, depending on an obtained light spectrum from an environmental light by means of a miniaturized spectrometer, is able to detect changes on the environmental light spectrum within an area in real time, in an optimum way.

More specifically, according to a first aspect hereof, an optoelectronic device is provided having a plurality of light emitters arranged to be able to illuminate an area of an environment, a CMOS-based miniaturized spectrometer arranged to obtain the light spectrum of environmental light within the area of the environment, and a control device, means, and/or method for modifying the emission of the light emitters, based on the obtained light spectrum.

With such an optoelectronic device, an optimum control of the light reflected on an environment is achieved, which is able to detect any changes in the environmental illumination through its spectral characteristics, and change the light properties of an emitted light in a desired way.

Also, the area of the environment which is illuminated by the plurality of light emitters when they are lit, and which reflects light towards the spectrometer, may additionally be illuminated by further light sources, and therefore, the changes in the environmental light may also take into account other lights (being artificial, natural, or reflections of nearby objects or people) which are adjacent or placed near the optoelectronic device.

Complementary metal-oxide-semiconductor (CMOS) is a technology for constructing integrated circuits. CMOS technology is used in microprocessors, micro controllers, static RAM, and other digital logic circuits. CMOS technology is also used for several analog circuits such as image sensors, data converters, and highly integrated transceivers for many types of communication. Therefore, by a CMOS-based spectrometer, it should be understood a spectrometer that has been fabricated by using technological processes that are commonly utilized in a CMOS facility or foundry. In this sense, it is worth mentioning that the optical dispersive element (grating) and the light or image sensor that are included in the spectrometer can be fabricated using a variety of techniques that exist within the CMOS technology.

For example, the dispersive element could be made by optical lithography, but also by other more advanced processes such as nanoimprinting.

The nanoimprinting method makes use of a stamp material, typically silicon or quartz, with a pattern produced by electron-beam (e-beam) lithography. The stamp is then physically pressed against a substrate coated with a UV-curable low-viscosity resist, thus transferring the desired circuit pattern to the substrate in a one-shot process. The substrate is hardened by shining UV light through it. At this point, the stamp is removed, leaving a three-dimensional imprint of the circuit in place on the substrate. This ability to apply a 3D pattern to a substrate in a single process is ideal for integration of optical gratings in CMOS technology. Regarding the light array (or image) sensor, the most used examples in CMOS technology are CMOS sensors and CCD sensors (closely spaced array of gated MOS capacitors on a continuous dielectric covering the semiconductor surface), but other light detection systems exist that are CMOS-compatible and can be potentially used.

Furthermore, the devices, means, and/or methodologies for modifying the light emitted by the light emitters may be in a computing controller, such as a micro-controller, a microprocessor, a Digital signal processor (DSP), a Field programmable gate array (FPGA), or any other electronic block suitable for controlling the interaction between the spectrometer signal and the light emitters. More precisely, said computing controller may provide the electronics needed to adapt the signals provided by the spectrometer, and may further have driving electronics to provide power to the light emitters.

The computing controller and the electronic drivers may also include devices, means and/or methodologies for individually controlling the output of each light emitter of the optoelectronic device, by techniques such as Amplitude modulation (AM) or Pulse Width Modulation (PWM) or other known techniques, enabling the light emitters to emit a specific light with a specific spectral content, related to the obtained light spectrum.

The relationship between the obtained light spectrum and the emitted light may involve mathematical expressions of different degree of complexity. For example, the easiest relationship is a linear response between the obtained spectrum and the spectrum of the emitted light, but other more sophisticated relationships can be established. For example, highly non-linear relations are possible in light switching applications as a function of a parameter of the obtained light spectrum.

Other approaches may require changing the light output through algorithms allowing continuous closed-loop adjustments of the emitted light in order to function correctly.

Further schemes involving computation or communications by light may require complex mathematical relationships between the obtained and emitted lights, using other input variables such as the ones obtained through the communication ports of the micro-controller or other storage nodes.

Thus, depending on the application, a wide variety of relationships between the obtained light spectrum, inputs entered through the communication ports or storage nodes and the emitted light are possible.

Also, since full control over the light spectrum emitted by the optoelectronic device can be achieved, spectra with different luminous efficacy of radiation (LER) can be emitted, by providing only spectral power in those regions where the human eye is most sensitive, resulting in an interesting means of modulating the energy consumption of an environment for those applications for which energy efficiency is a concern.

Furthermore, the optoelectronic device may be fixed on a surface of an area, such as a ceiling of a room or wide area, or it may also be embodied as a portable handheld device, in such a way that it can be used in any location, transporting it from one place to another and placing it wherever necessary.

According to an implementation, the spectrometer has a light inlet to obtain the light spectrum of the environmental light.

According to a further implementation, the device has at least one optical element coupled to the light inlet, for increasing the incoming light flux through the light inlet.

In this way, by using the optical element coupled to the light inlet, the solid angle of light collection of said light inlet is increased, thus obtaining a larger amount of environmental light. Therefore, the obtained light spectrum of the environmental light from a given area is more precise, since the signal-to-noise ratio is increased.

According to a specific implementation, the optical element includes an optical lens set.

An appropriately designed optical lens or set of lenses may highly improve the coupled flux of ambient light from the environment which, given the low light sensibility of the present-day miniaturized spectrometers, is difficult to obtain, specially if the light intensity of an environment is low or too dim.

Also, the device may further include a waveguide element having a first end and a second end, the first end coupled to the optical element. Said waveguide element may be, for example, an optical fiber waveguide, or a waveguide integrated into CMOS technology.

An additional waveguide may be useful in case that the spectrometer is encapsulated in an area further away from the plurality of light emitters. In this manner, the light entering into the waveguide can be guided towards the inlet of the spectrometer, which does not have to be necessarily placed in a specific location in order to assure light clearance of its surroundings, enabling a more efficient distribution of the elements of the optoelectronic device.

According to another implementation, the device further has a second optical element coupled to the second end of the waveguide element.

A second lens or set of lenses may be useful to efficiently couple the incoming flux of light in the second end of the waveguide. For example, the second end of an optical fiber may not have a numerical aperture suitable for gathering diffuse environmental light, and therefore, a lens or set of lenses can be used at the end (where the light is collected from the environment) in order to increase the amount of incoming photons from the environmental light.

Also, the light emitters may include at least one solid-state light emitter, which may be, specifically, LEDs or other similar or more advanced solid-state emitters, which are suitable to emit a light with a narrow-band spectrum such as lasers or those made of quantum dots and/or wires of different luminescent materials.

Alternatively, other suitable broadband light emitters may be used, depending on the application, such as phosphor-based LEDs operating through wavelength down-conversion of a ultra-violet (UV) LED, or other conventional lighting technologies.

According to an implementation hereof, the first or second optical element is movable, and the device further includes a device, means, or a methodology for moving said first or second optical element.

In this way, the optical elements may be directed towards a specific zone where an environmental light of interest is found, thus allowing to fix the optoelectronic device on a surface, and, at the same time, allowing to obtain a light spectrum from different zones nearby, and not a fixed one. Also, the elements of the device may optionally be embedded in a single housing, thus making the optoelectronic device compact and adaptable to be displayed in different areas, having a volume comparable to that of a conventional light bulb.

In a possible implementation, an optoelectronic device as that previously described, may include a plurality of light emitters and, additionally, may also be connected through a cable, wireless or by any type of communication technology with at least another light emitter, thus also being able to modify the emission of said light emitter. In this way, one optoelectronic device may be placed in one location, but it may control not only its own light emitters but also other emitters nearby, which, for example, could have been already installed before the installation of the optoelectronic device in the area.

According to a second aspect hereof, a system for modifying the environmental light of an area is provided, the system having at least two optoelectronic devices as previously described, and devices, means, and/or methodologies to transmit information between them.

According to an implementation hereof, the system may be such that:
- at least a first optoelectronic device further includes devices and/or methods for obtaining and devices and/or methods for transmitting a light spectrum parameter corresponding to an obtained light spectrum, to a further optoelectronic device; and
- at least a second optoelectronic device includes devices and/or methods for receiving a light spectrum parameter corresponding to an obtained light spectrum, and devices and/or methods for modifying the emission of its light emitters based on the received parameter.

In this manner, a system may have a plurality of optoelectronic devices displayed over an area in such a way that, when any or a particular external change in the environmental light of the area takes place (e.g. light entering from a window, or a candle is lit by a user), one or more optoelectronic devices can detect said change or perturbation through a change in the spectrum of the environmental light, being able to send information related to said change to one or more optoelectronic devices, that may be adjacent or not. This enables the other devices to modify, for example, the light spectrum of the light of their emitters, thus reproducing a particular environmental light intensity and/or spectral distribution, over the area under consideration, in response to any or a particular environmental change detected by a first device.

The light spectrum parameter corresponding to an obtained light spectrum can include several different data. For example, when a light spectrum is obtained, one possibility is that a device transmits a parameter which includes the whole set of spectral data points of said specific obtained light spectrum, thus allowing a further device to receive these data, and enabling its own light emitters to emit a light with the received spectral content. This way of functioning could be named "copy mode", since a receiving device emits a light copied from an environmental light obtained by another device.

Other particular examples of light spectral parameters are related to any light properties that could be extracted from the spectral information such as color coordinates in any color space, Correlated Color Temperature (CCT), distance from the Blackbody locus ($D_{uv}$), energy efficiency variables such as efficacy, color rendering information (such as CRI—color rendering index—or CQS—color quality scale—), total flux or light intensity, light directionality, etc. . . .

In addition, the parameter may reflect other characteristics inferred through the obtained light spectrum, but that are not directly related to the physical or colorimetric properties of the obtained light itself. Thus, the parameter may include geometrical information of the objects or people in a particular space, providing information of objects' colors, shapes, positions, velocities or even control of air quality. It may also include information on time-dependent or dynamic phenomena such as rates of changes or blinking objects.

Furthermore, the information that is transferred as a parameter has not necessarily to be directly extracted from the obtained light spectrum but can be triggered by some criteria over another parameter that it does. The parameter to be transmitted in case that the criteria is fulfilled can be stored in the storage nodes or generated in real time through a particular algorithm executed in the microcontroller, or may even include detailed programmatic code or instructions encoded in an understandable language or protocol that can be sent, being subsequently read by other optoelectronic devices or computers.

For the sake of illustration, a concrete application example might be a system of optoelectronic devices specifically programmed or designed to maximize the energy efficiency/savings of a particular interior or exterior space. In such a configuration, each single optoelectronic device is programmed in such a way that when a moving object is detected by the light reflections measured by its spectrometer, an instruction is sent to the rest of the network of optoelectronic devices to increase progressively their output flux up to a pre-established level of comfort. Alternatively, the instruction could be not referred to the output flux but to another light parameter related to color quality or any other spectral property, or perhaps could reproduce any other light preset stored on the storage nodes.

Other more complex instructions could be included in the parameter, depending on the application under consideration, involving operations or instructions that are sent to only a set of optoelectronic devices, or enabling a set of devices to emit a light with a specific predetermined light spectrum.

The devices, means and/or methodologies for transmitting a light spectrum parameter may be any communication network such as an Ethernet cable, wireless communications, or any other suitable type of communication commonly used for transmitting data between digital devices, using any protocol, either pre-established or specifically designed for an application of the system.

Furthermore, an optoelectronic device that receives a first parameter corresponding to a change in the spectrum of the environmental light, in addition to having a device, means, or methodology for modifying the light spectrum of the light emitted by its light emitters, may further include a device, means, or methodology for sending a further parameter corresponding to said environmental light spectrum change, to another optoelectronic device.

In this way, a parameter which can be used to monitor changes in the spectrum of a light of a certain area (the area of the device that detected that changes), can be sent directly to other devices (e.g. by broadcasting a signal to the rest of devices) or by passing through a chain of several devices, depending on the desired application.

The changes in the light spectrum may be caused by a change in an ambient light found within the area (for example, a daylight change associated with the weather or with the time of the day, entering through a window inside the area, or the change of the on/off state of an artificial light such as a lamp, found in that area). Also, the presence of static or moving objects and people, may also affect the environmental light spectrum of a part of an area. For example, depending on the colors of the clothing of a person, several spectral components may be filtered, altering the reflected light that is collected by the optoelectronic device. These different changes may be used to recognize different situations within the area and perform actions according to said changes.

Different spectral patterns may be recognized, such as patterns corresponding to a change in the weather conditions (for example, a sunlight change), the entering or leaving of a person or animal within the area of the system, or detection of dynamic events such as people tracking (for example in buildings and hospitals) or object tracking (for example high valued objects in homes or museums) or other applications involving pattern recognition. In response to any of these stimuli, the system could react by emitting a specific predetermined environmental light using some or all of the optoelectronic devices of the system.

According to a further implementation, the system for modifying an environmental light of an area further includes a computer server having a device, means, or method for receiving at least one light spectrum parameter, from an optoelectronic device; a device, means, or method for determining at least one further optoelectronic device to send a further parameter based on the received light spectrum parameter, and a device, means, or method for transmitting the further parameter to the determined optoelectronic device.

The optoelectronic devices may be connected to a computer server which may receive the parameters corresponding to any obtained light spectrum by any optoelectronic device, and may determine which other optoelectronic device may receive said parameter or other information which may enable the device receiving this information to emit a light with a specific light spectrum. It has to be pointed out that a parameter corresponding to a first obtained light spectrum may cause that a light emitter of a further device emits a light with a second specific spectrum, the first and second spectrum not necessarily being the same.

Alternatively, according to another implementation hereof, the at least a first optoelectronic device further includes a device, means, or method for determining at least a further optoelectronic device to send the received light spectrum parameter.

Also, said means for determining a further device to send a parameter may be in one or more devices or methods, or in a combination of a computer server with determination means or methods and other devices with determination means or methods, depending on the requirements of each specific application intended for the system.

According to a further implementation, the system includes a device, means, or methods for obtaining a similarity parameter between the obtained light spectrum and a predetermined spectrum pattern, and wherein the determination of at least a further light reproducing device to send the received light spectrum parameter is performed by considering the obtained similarity parameter.

This may be a manner of determining an action (e.g. allowing the light emitter of a device to emit a certain light spectrum, or sending other parameters to other devices). For example, several predetermined light spectra corresponding to different situations (sunlight, candle light, fluorescent, natural phenomena, etc. . . . ) may be used to perform a comparison with an obtained light spectrum, thus determining the actions to be taken (e.g. emitting a light with a spectrum with a lower intensity, a predominant color, switching off a group of light emitters from further devices, etc. . . . ).

Another example that can be applied to theatres or life sports relates to a system that is configured or trained to detect different patterns corresponding to specific events during the show, which, once detected, may trigger a certain type of illumination condition or dynamic lighting effects that may partially or totally involve the optoelectronic devices of the system.

In a broad sense, other complex interactive environments for many applications can be potentially created, where individuals' actions are the primary inputs, and the lighting system reacts as a whole, each single device processing its obtained spectral information and/or sending parameters to other optoelectronic devices or computer servers, all the system functioning to accomplish a predetermined effect related to any particular application, game or just to create space atmospheres with some degree of interactivity between individuals and light.

According to a further implementation, at least one optoelectronic device of the system further includes a device, means, or method for obtaining a similarity parameter between the obtained light spectrum and a predetermined spectrum pattern, and wherein its device, means, or method for modifying the emission of the light emitters modify the emission based on the obtained similarity parameter.

According to a further implementation, a neural network is established using each optoelectronic device of the system as a node of the neural network.

According to a further implementation, a method for modifying an environmental light of an area in a system for modifying an environmental light of an area, the system including a first and second optoelectronic device, and the method including:
  Obtaining a light spectrum from the environmental light using the first optoelectronic device;
  Obtaining a parameter corresponding to the obtained light spectrum using the first optoelectronic device;
  Sending the obtained parameter from the first optoelectronic device to the second optoelectronic device.

Also, according to a further implementation, a computer program product including program instructions for causing a computer to perform the method for modifying an environmental light is provided. The computer program may be embodied on a storage medium or on a carrier signal.

Furthermore, according to another aspect, the use of a CMOS based miniaturized spectrometer is provided, for obtaining the light spectrum of environmental light within the area, in an optoelectronic device as previously described.

According to a further aspect, a reflective device is provided, for determining the calibration of an optoelectronic device as previously described, the reflective device comprising a surface with a reflective portion.

Also, a method for determining the calibration of an optoelectronic device is provided, using a reflective device as previously described, the method comprising:
  Arranging the reflective device at least partially within the area of an environment which the light emitters are able to illuminate;
  Emitting a light with an expected light spectrum through use of the plurality of light emitters;
  Obtaining a real light spectrum, from the light at least partially reflected by the reflective device, using the miniaturized spectrometer;
  Obtaining a similarity parameter between the obtained real light spectrum and an expected reflected light spectrum corresponding to the emitted expected light spectrum;
  Determining the calibration of the optoelectronic device based on the similarity parameter.

In this way, by using the reflective device, a calibration can be performed of the relationship between the electrical power (current and/or voltage) provided by the electronic drivers to any light emitter and the real light output of the same light emitter.

The reflective device may be any device suitable to be arranged within the area which can be illuminated by the light emitters, and could be, for example, a cover placed in front of the light emitters, being attached either screwed or fixed by any fixing means. The reflective surface is such that its reflective response is known to (or can be obtained by) the optoelectronic device, thus being possible to obtain, given an emitted light, how its reflection spectrum should be.

More specifically, an expected predetermined light can be emitted, by providing a specific predetermined current or voltage to the light emitters (by, for example, the microcontroller, which may use a driver to generate such current or voltage). It has to be noted that it is not necessary to perform the step of emitting said expected light after performing the step of arranging the reflective device, as long as the step of obtaining a real light spectrum, which has been reflected by the reflective device, is performed after the step of arranging and the step of emitting.

Then, by arranging a highly reflective device, which may be, for example, a cover screwed or attached to the optoelectronic device in front of the light emitters, the real emitted light (which may not be the expected one) reflects on a surface of said device and, using the spectrometer, a light spectrum of said real reflected light is obtained.

Since the reflective response of the reflective device is known, an expected reflected light spectrum corresponding to the emitted expected light spectrum can be previously determined (for example, being stored within a memory device or means of the optoelectronic device) thus enabling the obtaining of a similarity parameter between it and the obtained real light spectrum.

If this similarity parameter implies that the expected reflected light spectrum and the obtained real light spectrum are different, this would mean that the light emitters may be emitting a different light than they were supposed to, and thus a calibration should be performed by, for example, changing the current or voltage applied to the light emitters.

This may be useful since light emitters may change their emissive properties during their lifetime, and therefore different currents and/or voltages may be required over time, to emit the same light.

Other methods for calibrating the light output of an optoelectronic device may also be used, such as that including mechanical parts able to direct the spectrometer directly towards the light emitters.

BRIEF DESCRIPTION OF THE DRAWINGS

Several implementations of the present disclosure will be described in the following, only by way of non-limiting example, with reference to the appended drawings, in which:

FIG. 1 illustrates an optoelectronic device, according to an implementation hereof;

FIGS. 2a-2c illustrate different alternatives of a part of an optoelectronic device, according to another implementation;

DESCRIPTION

Figure 3:
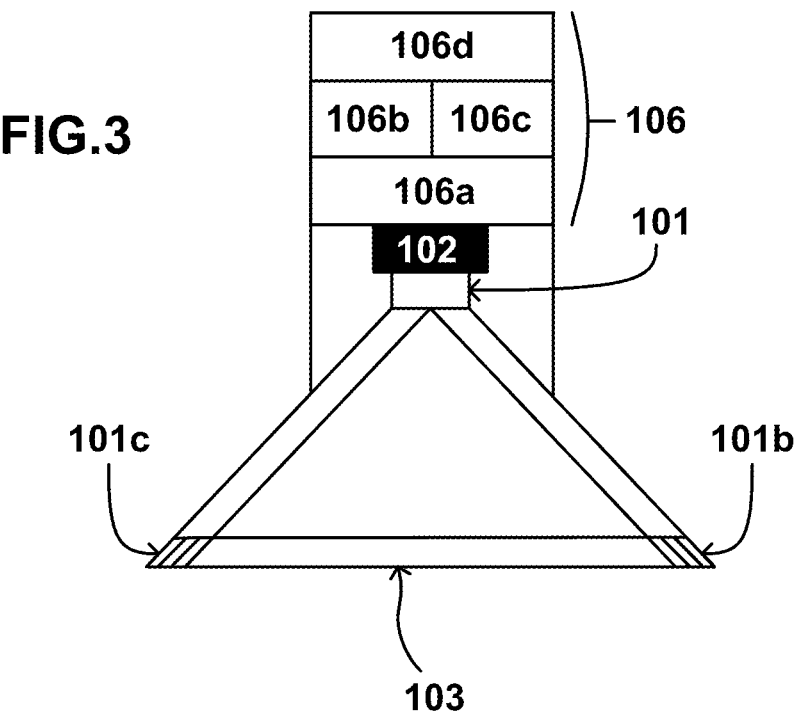
FIG. 3 depicts an encapsulated optoelectronic device, according to an implementation.

According to a first implementation of a development hereof, an optoelectronic device will be described using the accompanying figures. More specifically, in FIG. 1, an optoelectronic device 100 is represented, having a miniaturized spectrometer 102, having a light inlet and a first coupling lens 101 displayed between said light inlet and the exterior, designed in such a way that maximizes the light flux coupled from the environmental light into the light inlet of the spectrometer 102.

Furthermore, according to this implementation, the spectrometer 102 and its coupled lens 101 are displayed in the centre of a panel having an LED array embedded in an LED panel 103 (more specifically, a printed-circuit board or PCB). This position is optimal, since the optical axis of the light inlet and the lens 101 points towards the same direction as the light emitted (i.e. symmetry axis of light angular distribution) by the LED panel 103, therefore capturing environmental light of at least part of the area illuminated by the LEDs. The light emitted by the PCB of LEDs 103 impinges the objects and surfaces of a particular area, and a portion of this reflected or dispersed light is captured again by the spectrometer 102 through the coupling lens 101, being possible to extract information of the surroundings by analyzing the collected light (ambient light probing). The coupling lens 101 may also couple light from other light sources different from the LED panel 103 present in the space under consideration, either by following a straight optical path or after suffering one or multiple reflections within the space. In this way, photons exiting from a variety of sources similar or dissimilar (for example, natural or artificial light) to the optoelectronic device presented herein may end up being collected by the coupling lens.

The displaying of the spectrometer 101 and its lens 102 may vary depending on the intended applications for the optoelectronic device, or depending on the function of each device or on how the devices are distributed within the area, and therefore each device will be controlled in a different way within the system. Other implementations depicting variations on the displaying of the spectrometer 102 will be described later, according to further figures.

The spectrometer 102 is embodied in a CMOS type microchip, which, in this example, is a micro-spectrometer which includes a nanoimprinted grating, although a wide range of techniques exist in which said grating could be embodied within the micro-chip, which may also be suitable. A commercial example of a suitable micro-spectrometer may be the new series of microchip-embodied spectrometers manufactured by Hamamatsu™.

Also, the device 100 includes a device, means, or method for modifying the emitted light 104 by either its own LED panel 103 or by other light sources. These devices, means or methods are embodied in an electronic microcontroller having a device, means or methods for adapting the signals coming from the spectrometer into electric signals suitable to be processed by a microcontroller. Also, the microcontroller or a dedicated electronics can adapt a received light-spectrum read out by the mini-spectrometer and, according to a set of rules, depending on different situations and the application intended for the device, modify the emission of part or the whole LED panel 103, by sending them the appropriate current through the electronic drivers. A microcontroller optimization algorithm may determine the current that every single LED requires (by reading a calibration table) in order to get a desired overall spectrum of an emitted light. The spectrum of this emitted light is the sum of all the individual LED light spectra.

The LED array embedded in a LED panel 103 may include several LEDs, each of them being able to emit in a certain portion of the electromagnetic spectrum, thus covering the whole spectrum range of the particular application that may include visible or invisible light or a combination of both. This is useful since, when a specific spectral content has to be emitted, the system is able to vary the intensity of each LED emission in order to obtain the desired spectrum. Therefore, a large number of LEDs (typically in the range between 5 and 50) are used, the higher this number, the more accurate is the reproduction of any arbitrary light spectrum. In order to achieve the best homogeneity and photometric characteristics, the LED PCB 103 may be attached to further optical systems including lenses and diffusers.

As seen in the detailed FIG. 2A, the spectrometer 102 and the lens 101 may be held in direct contact in order to couple the ambient light as shown in the configuration of FIG. 1. Other more sophisticated configurations are also possible, as depicted in FIG. 2B, where a waveguide in the form of an optical fiber 105 is attached to one end to the lens 101, and in the other end, to a further lens 101a, similar to the original lens 101. In this manner, there is no need to place the spectrometer 102 and the lens 101 in the same place in order to obtain the desired environmental light, and since the optical fiber is flexible, only the second lens 101a and the end of the fiber attached to it may be placed in a desired surface, while receiving similar or even higher levels of coupled flux than in the previous alternative of FIG. 2A, depending on the numerical aperture of the fiber and the Lagrange invariant of the overall optical system.

Another alternative may be that depicted in FIG. 2c, wherein, instead of one, two optical fibers 105a, 105b are displayed within a housing, with one end attached to the first lens 101 and the other end attached to two further lenses 101b, 101c. Said lenses are approximately placed in the same plane as the LED array, while the spectrometer 102 may be placed further away from the coupling lenses 101b and 101c. In this way, a better encapsulation of the optoelectronic device is achieved, allowing also further configurations provided with movable coupling elements 105, 105a, 105b, 101a, 101b, 101c, in order to collect light coming from different regions or directions within the space under consideration. These movable parts could also be governed by the microcontroller.

This encapsulation is better viewed in FIG. 3, wherein packaging of the optoelectronic device 100 including the optical fiber configuration depicted in FIG. 2c along with the electronic block 106 is given.

In this configuration, photons collected by the lenses 101b and 101c are coupled into the spectrometer 102 through lens 101. The compact spectrometer 102 is able to classify these photons according to their energy and provide an electronic signal representing the obtained photon distribution (spectrum). An optional signal-conditioning electronic block 106a may be necessary to adapt the signals and the operation modes (for example integration times of the read out process, sensitivity or gain of the CMOS sensor, etc. . . . ) between the spectrometer 102 and the microcontroller 106b. The microcontroller 106b, once the spectral information is read out, may compute a particular spectral parameter through a dedicated algorithm and take action either over the electronic drivers 106c that subsequently alter the spectral output of the LED array 103, and/or over the communications and storage block 106d, sending for example a parameter or a pre-stored information over a network. Obviously, a last power electronics block would be also necessary, having either a battery for stand-alone devices and/or a current rectifier for wall-plugged devices but has been deliberately omitted from the drawings for the sake of simplicity.

Furthermore, the device depicted in FIG. 3 may work in any of the light coupling configurations shown in FIG. 2 as well as with multiple optical fibers coupled to the coupling lens 101 (some of them even movable) without loss of generality. Alternatively, other sensors could be easily integrated such as temperature sensors, humidity sensors, air flow speed sensors, light intensity sensors (silicon, solar cells, etc.), image (CMOS or CCD arrays) sensors to provide further functionalities without limiting the scope hereof.

Figure 4:
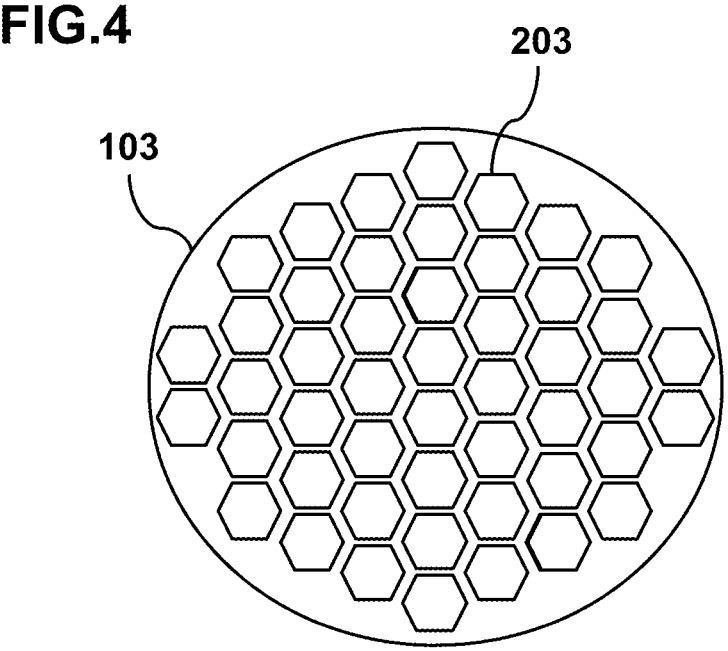
FIG. 4 illustrates a detail of the optoelectronic device depicted in FIG. 3, according to an implementation.

FIG. 4 depicts the base of the optoelectronic device, showing the LED panel 103 and a typical arrangement of the plurality of LEDs 203 within it. The basic cell containing the plurality of light emitters 203, that are able to reproduce an arbitrary spectrum, are replicated periodically in order to increase the radiometric (non-visible applications) or luminous (visible applications) power of the overall emitted light. At the same time, this replication provides an increase of the color and spectral homogeneity of the output light.

Figure 5:
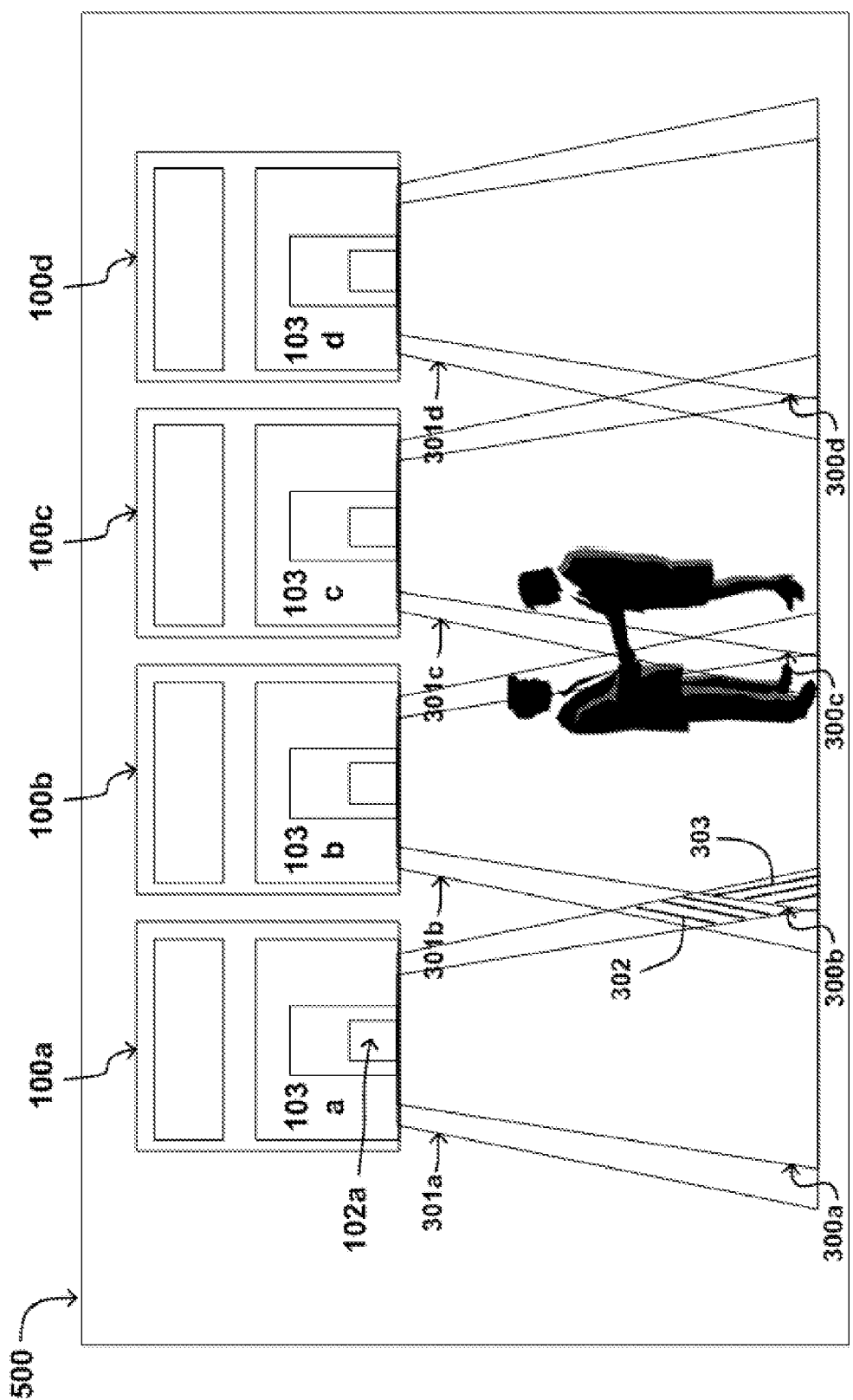
FIG. 5 depicts a system for modifying an environmental light of an area, according to a further implementation; and, FIG. 6 depicts a system for modifying an environmental light of an area, according to a further implementation.

According to a further implementation, FIG. 5 depicts a system for modifying the environmental light of an area 500, including a plurality of optoelectronic devices 100a-100d, whose LED panels 103a-d (only 103a signaled) cover the sub-areas 301a-301d, and whose mini-spectrometers 102a-d (only 102a signaled) cover the sub-areas 300a-300d.

As it can be seen in this particular setting, the light cones emitted by the LED panels of each device (sub-areas 301a-301d) overlap each other partially, as in 302. In the same way, the "detecting" cones of each spectrometer (sub-areas 300a-300d) overlap the cones of light emitted by adjacent devices, as in 303.

In this way, when the devices are programmed in a "copy mode" (that is, the devices, means, and methods for modifying the emitted light of the LED array are programmed to emit a light that exactly matches the light spectrum obtained by the spectrometer of the same device), when an external change or perturbation in the spectrum of the light occurs in one of the sub-areas covered by an spectrometer of a device, the corresponding device detects said change and starts to emit a light with the detected light spectrum. Then, the area covered by its own LED array is detected by the spectrometers of other devices, triggering these other devices to obtain the new light spectrum and to start emitting a light with said new light spectrum, thus creating a chain reaction that spreads out the original perturbation all over the area covered by all the devices, achieving a new environmental light in response to said first change or perturbation.

Said change on the light spectrum of a part of the system's area (which may be detected by one device) may be caused by a change in the light coming from outside the area (e.g. the sunlight, a flash of an artificial light coming from another space, etc.), an intentionally done change (someone aiming a flashlight towards an spectrometer), or, for example, the entrance of people into the room, or their movement around said room.

Also, a change in the environmental light may be caused by a programmed change in the emission of an array of LEDs of a particular optoelectronic device (that is, for example, the emission of a light with a pre-stored light spectrum, programmed by the user, to be performed at certain time of the day), enabling a chain reaction and an overall change of the environmental light of an area by just automatically changing only the emission of only one device of the system.

Of course, the devices of the system may be programmed differently among them, being a part of them static (not modifying their own light emission upon any spectral change) and another part being modifiable (for example, functioning in a "copy mode" as previously described).

A possible application of this system may be, for example, the transmission of information on daylighting conditions from a device close to a window, to the interior of the building.

Other applications include human interactions with intelligent lighting environments, so that human expressions take an active part as inputs into the intelligent system, to achieve a desired objective or emotional state within the environment.

Further examples include interactive games. For example, a game where the users, having different colored flashlights, have to change the overall lighting of an area by aiming their flash light or torch towards the devices, and where the winner is the team that changes all of the area's lights into their color.

A further implementation may be a system with a plurality of optoelectronic devices displayed as the previously described system, where each characteristic wavelength of the light emitters represents a communication channel. In this sense, a user or a computer program can govern a particular optoelectronic device to serve as an emitter, with a number of channels determined by the number of emitters with different characteristic wavelength it has, and being all type of digital, multi-logic or analog communications protocols allowed in each single channel. In this way, the rest of the optoelectronic devices are able to receive these spectral components through its own spectrometer, and either continue to transmit the same information to other devices by reproducing a light with the same light spectrum, or decipher the information by decoding the information contained in each communication channel and take the required action.

In this way, information can be encoded within a light spectrum of an emitted light (that is, encoded by using the characteristic wavelength of each single LED as communication channels) and, when emitted by said first optoelectronic device, the emitted light can be detected by other optoelectronic devices which, when configured in a "copy mode" (a device obtains a light spectrum and emits the same light spectrum with its own LED array), cause a chain reaction, the light spectrum including encoded information sent by an emit-copy chain through other optoelectronic devices.

In a further implementation, the system includes a computer server, connected to all the optoelectronic devices of the system. This connection (by a communication network via cable, wireless, or any other suitable type of communication between computing devices) enables the optoelectronic devices to send information to said server, corresponding to any change in a detected light spectrum within its corresponding area, thus letting the server control the actions to be performed by any optoelectronic device. The decisions taken by the computer server may include other inputs such as the time of the day or other relevant information (e.g., historical information corresponding to previously detected spectral changes on other optoelectronic devices, other sensors, etc.).

In this way, the system may be connected to other systems that may or may not be of the same type, via the computing server. Such additional systems may include sensor networks, micro grids, the Internet, other computing servers, or other electronic devices or communications networks of interest.

Furthermore, the optoelectronic devices can also communicate among each other and, for example, different types of optoelectronic devices can be programmed to control other optoelectronic devices, thus combining the use of the server and optoelectronic devices which can also control actions to be performed by other optoelectronic devices, which can be preferred depending on the application intended for the system, the position of the devices within one or more areas, etc.

Figure 6:
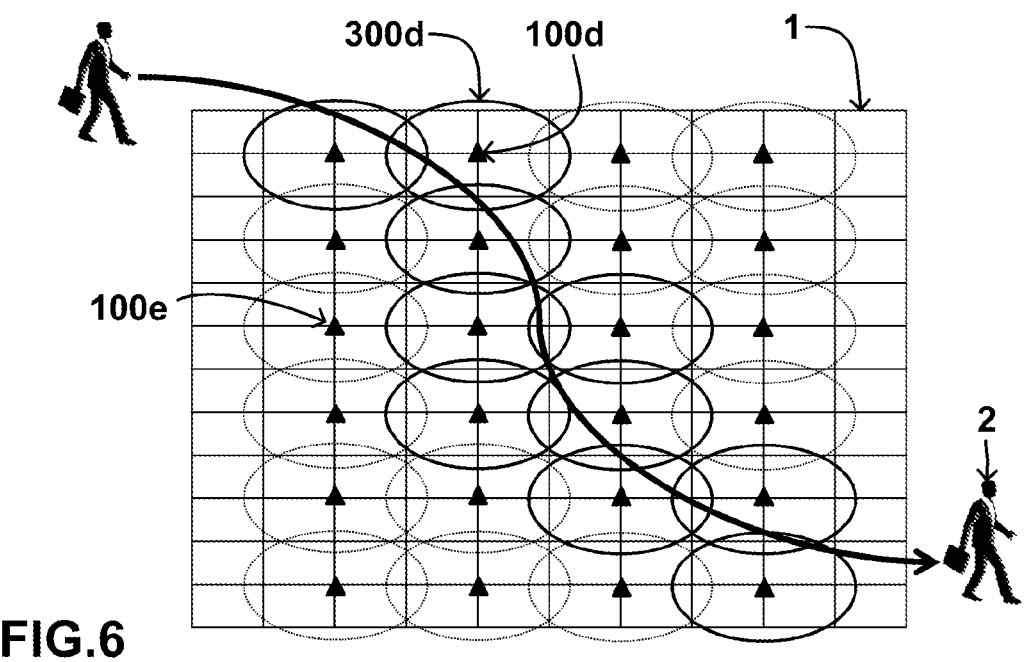

An example of a further application of the system is the implementation depicted in FIG. 6, wherein a system having a plurality of optoelectronic devices (such as the device 100d or 100e) according hereto is displayed in an area 1, in such a way that the sum of the ranges 300d of the spectrometers of each device 100d covers practically the whole area, with the aim of people or object tracking in that area, optionally emitting a suitable light accordingly and/or sending the information to further devices or computing servers. More specifically, as seen in previous implementations, the ranges 300d of the spectrometers overlap partially with each other, thus enabling the system to, whenever a person 2 passes through the area 1, going from one range to another, the overlapping area enables both devices to detect the person and either emit a predetermined light with a predetermined spectral content or send that information for further processing. This processing may include identification of individuals or people, based on computational programs. The computational algorithms may be in one or several optoelectronic devices (i.e. distributed programming), and/or in computer servers. In order to perform the pattern recognition, the algorithms may include techniques based on soft computing such as neural networks, fuzzy logic and/or other computational advanced paradigms.

For example, in order to detect a person within a range 300d of a device 100d, a predetermined pattern based on the received spectral content for that particular person is stored. Then, whenever this pattern is recognized by the system as being a person or object present in a pre-stored database, a signal of identification acknowledge or other information may be sent through a network to other optoelectronic devices or to a server, which may take the required action.

This information may include a set of instructions for other devices requiring them to emit a certain light, or may be sent directly to the drivers that control the LEDs for reproducing a light with a specific spectral content, which could pertain, for example, to a pre-set lighting setting of the user being tracked.

Said information may also include, for example, spectral features corresponding to lights reflected by different types of colors of clothes, types of clothes reflecting light in a specific manner, the type of reflection of human skin or hair, etc. . . .

Furthermore, movement of an object or a person can also be detected adding other characteristics such as how fast the spectrum changes, or if it changes from one type to another type, etc. . . . The information can be also gathered by comparing the spectra that different optoelectronic devices obtain on a particular space. This way of sharing the information through the communication ports among the optoelectronic devices and additional computing servers may help in tracking the changes occurring in the whole space where the lighting system is installed.

An application of this system may be one where the emitted light by all the devices is low or non-existent and, whenever a moving object or person passes below a particular optoelectronic device, this switches its emission to a comfortable illumination level, thus illuminating the path of the person as it goes. Since the read out ranges of the optoelectronic devices overlap each other, a configuration may be achieved where the path in front of the person is illuminated (as seen in the figure, illuminated by, for example, the device 100d, and the devices depicted with their range on a bold traced line) and, also, the light illuminating the path behind or far from the person can be dimmed (as seen in the figure, for example, the device 100e, and the devices depicted with their range on a light traced line), thus only illuminating a portion of the area adjacent to the person (and corresponding to the path he is walking towards), saving electrical energy in the overall process.

Artificial neural networks have been used in many applications since their renaissance in the eighties. Its most commonly used implementation is a program running on a personal computer or a workstation, and its wide use is because of the higher flexibility of its software, wherein users may easily modify the topology of the network, type of processing elements or learning rules according to the requirements of their application.

However, to implement the neural network on a sequential computer seems to be very paradoxical because the biological neural networks, from which artificial neural networks originate, operate highly in parallel.

A step to the highly-parallel neural systems is the utilization of several processing elements (neurons). In this sense, a system of optoelectronic devices may be suitable for carrying out such approaches to parallel computing.

In yet another implementation, the use of parallel computing on a system of optoelectronic devices may be embodied in the creation of a neural network, where the plurality of optoelectronic devices distributed in a space would act as nodes (artificial neurons) of the neural network. The connections or communications among nodes may be performed either through a communication network among them or by light having encoded information in its light spectrum, as previously described. In this sense, in such a system, the principles of non-linear, distributed, parallel and local processing and adaptation, normally used in a neural network, can be easily achieved.

In addition, the neural network is provided with a mathematical or computational model for information processing. The computational model may be stored and/or executed by the microcontroller of each optoelectronic device, and/or distributed among the plurality of optoelectronic devices, or even governed by a central processing unit through the communication ports such as a personal computer.

Although the present invention has been described in detail for purpose of illustration, it is understood that such detail is solely for that purpose, and variations can be made therein by those skilled in the art without departing from the scope of the invention.

Thus, while the preferred embodiments or implementations of the methods and of the systems have been described in reference to the environment in which they were developed, they are merely illustrative of the principles of the invention. Other embodiments and configurations may be devised without departing from the scope of the appended claims.

Furthermore, although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier may be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal, which may be conveyed via electrical or optical cable or by radio or other means.

When the program is embodied in a signal that may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. An optoelectronic device comprising:
a plurality of light emitters arranged to be able to illuminate an area of an environment,
a CMOS based spectrometer arranged to obtain the full light spectrum of environmental light within the area of the environment, the plurality of light emitters and the CMOS based spectrometer being structurally disposed relative to each other so that the environmental light within the area of the environment does not include any direct light from the plurality of light emitters; and
a microcontroller or dedicated electronics or a device for modifying the emission of the light emitters, based on the obtained full light spectrum;
wherein the CMOS based spectrometer has a grating for light dispersion fabricated using CMOS technology.

2. The optoelectronic device according to claim 1, wherein the spectrometer comprises a light inlet to obtain the light spectrum of the environmental light.

3. The optoelectronic device according to claim 2, further comprising at least one optical element coupled to the light inlet, for increasing an incoming light flux through the light inlet.

4. The optoelectronic device according to claim 3, wherein the optical element comprises an optical lens set.

5. The optoelectronic device according to claim 3, further comprising a waveguide element having a first end and a second end, the first end coupled to the optical element.

6. The optoelectronic device according to claim 5, wherein the waveguide element is an optical fiber waveguide.

7. The optoelectronic device according to claim 5, further comprising a second optical element coupled to the second end of the waveguide element.

8. The optoelectronic device according to claim 7, wherein the first or second optical element is movable, the device further comprising one or more of a microcontroller, dedicated electronics or one or more devices adapted to move one or both of said first or second optical element.

9. A system for modifying the environmental light of an area, comprising at least two optoelectronic devices according to claim 1, and one or more transmitters adapted to transmit information between them.

10. A system for modifying the environmental light of an area according to claim 9, wherein:
a first optoelectronic device further comprises one or more devices for obtaining and one or more devices for transmitting a light spectrum parameter corresponding to an obtained light spectrum, to a second optoelectronic device; and
the second optoelectronic device comprises one or more devices for receiving the light spectrum parameter corresponding to the obtained light spectrum, and one or more devices for modifying the emission of its light emitters based on the received light spectrum parameter.

11. A system for modifying an environmental light of an area according to claim 10, further comprising a computer server comprising a microcontroller or dedicated electronics or device for receiving the light spectrum parameter, from the first optoelectronic device; a microcontroller or dedicated electronics or device for determining a third optoelectronic device to send a second parameter based on the received light spectrum parameter, and a microcontroller or dedicated electronics or device for transmitting the second parameter to the third optoelectronic device.

12. A system for modifying an environmental light of an area according to claim 10, wherein the first optoelectronic device further comprises a microcontroller or dedicated electronics or device for determining a fourth optoelectronic device to send the light spectrum parameter.

13. A system for modifying an environmental light of an area according to claim 11, further comprising a microcontroller or dedicated electronics or device for obtaining a similarity parameter between the obtained light spectrum and a predetermined spectrum pattern, and wherein the determination of the third optoelectronic device to send the received light spectrum parameter is performed taking into account the obtained similarity parameter.

14. A system for modifying an environmental light of an area according to claim 9, wherein at least one of the optoelectronic devices of the system further comprises a microcontroller or dedicated electronics or device for obtaining a similarity parameter between the obtained light spectrum and a predetermined spectrum pattern, and wherein the microcontroller or dedicated electronics or device for modifying the emission of the light emitters modifies the emission based on the obtained similarity parameter.

15. A system for modifying an environmental light of an area according to claim 11, wherein a neural network is established using each optoelectronic device as a node of the neural network.

16. A method for modifying an environmental light of an area by a system according to claim 9 comprising a first and second optoelectronic device, the method comprising:
- obtaining a light spectrum from the environmental light through a spectrometer of the first optoelectronic device;
- obtaining a parameter corresponding to the obtained light spectrum through the first optoelectronic device; and,
- sending the obtained parameter from the first optoelectronic device to the second optoelectronic device.

17. A computer program product comprising program instructions for causing a computer to perform the method for modifying an environmental light, according to claim 16.

18. A computer program product according to claim 17, embodied on a storage medium.

19. A reflective device for determining the calibration of an optoelectronic device according to claim 1, comprising a surface with a reflective portion; wherein the reflective device is configured to be arranged in front of the light emitters of the optoelectronic device for reflecting real light emitted by the light emitters such that a light spectrum of said real reflected light can be obtained by the spectrometer of the optoelectronic device.

20. A method for determining the calibration of an optoelectronic device; the optoelectronic device according to claim 1, through use of a reflective device for determining the calibration of an optoelectronic device, the reflective device comprising a surface with a reflective portion, wherein the reflective device is configured to be arranged in front of the light emitters of the optoelectronic device for reflecting real light emitted by the light emitters such that a light spectrum of said real reflected light can be obtained by the spectrometer of the optoelectronic device; the method comprising:
- arranging the reflective device at least partially within the area of the environment which the light emitters are able to illuminate;
- emitting a light with an expected light spectrum through the plurality of light emitters;
- obtaining a real light spectrum through the spectrometer from the emitted light which has been reflected by the reflective device;
- obtaining a similarity parameter between the obtained real light spectrum and an expected reflected light spectrum corresponding to the emitted expected light spectrum; and,
- determining the calibration of the optoelectronic device based on the similarity parameter.

\* \* \* \* \*